(12) United States Patent  (10) Patent No.: US 7,581,787 B2
Livne  (45) Date of Patent: Sep. 1, 2009

(54) BICYCLE SEAT LOCK

(75) Inventor: Oren Livne, Tel Aviv (IL)

(73) Assignee: Ino Vision Ltd., Tel Aviv (IL)

( * ) Notice: Subject to any disclaimer, the term of this patent is extended or adjusted under 35 U.S.C. 154(b) by 50 days.

(21) Appl. No.: 11/764,201

(22) Filed: Jun. 17, 2007

(65) Prior Publication Data

US 2008/0309130 A1   Dec. 18, 2008

(51) Int. Cl.
 *B62J 1/00* (2006.01)
 *B62H 5/00* (2006.01)

(52) U.S. Cl. .............. 297/215.13; 297/201; 70/233; 70/31; 70/35

(58) Field of Classification Search .............. 297/201, 297/195.1, 217.1, 195.13, 463.2, 215.13; 70/233–236, 31, 35; 280/288.4
See application file for complete search history.

(56) References Cited

U.S. PATENT DOCUMENTS

| | | | | |
|---|---|---|---|---|
| 4,568,121 A * | 2/1986 | Kashima | ............. | 297/215.15 |
| 4,877,286 A * | 10/1989 | Hobson et al. | ......... | 297/215.13 |
| 5,156,031 A * | 10/1992 | Gaul | ........................... | 70/233 |
| 5,244,301 A * | 9/1993 | Kurke et al. | ................ | 403/390 |
| 5,380,061 A * | 1/1995 | Pendleton | ................ | 297/195.1 |
| 5,405,113 A * | 4/1995 | Jaw | ......................... | 248/229.1 |
| 5,622,066 A * | 4/1997 | Shallis | ....................... | 70/233 |
| 5,678,435 A * | 10/1997 | Hodson | ...................... | 70/233 |
| 5,823,618 A * | 10/1998 | Fox et al. | .................... | 297/201 |
| 5,911,474 A * | 6/1999 | Lee | ............................ | 297/201 |
| 5,979,978 A * | 11/1999 | Olsen et al. | ............ | 297/215.15 |
| 6,036,214 A * | 3/2000 | Ono et al. | ................ | 280/288.4 |
| 6,290,291 B1 * | 9/2001 | Kojima | ....................... | 297/201 |
| 6,402,236 B1 * | 6/2002 | Yates | ......................... | 297/201 |
| 2007/0277569 A1 * | 12/2007 | Vitali | ......................... | 70/233 |

FOREIGN PATENT DOCUMENTS

DE    10023978 A1 * 11/2001

* cited by examiner

*Primary Examiner*—David Dunn
*Assistant Examiner*—Tania Abraham
(74) *Attorney, Agent, or Firm*—Dekel Patent Ltd.; David Klein

(57) ABSTRACT

Bicycle apparatus for use with a bicycle that includes a bicycle seat post, the apparatus including at least one bicycle seat support member, a pair of locking members mechanically linked to the bicycle seat support member, and a lock adapted to lock the locking members to each other, wherein in a first position the bicycle seat support member is securable to a bicycle seat post of a bicycle for use as a bicycle seat support, and in a second position the bicycle seat support member is arranged for locking the bicycle by being locked with the locking members and the lock.

7 Claims, 7 Drawing Sheets

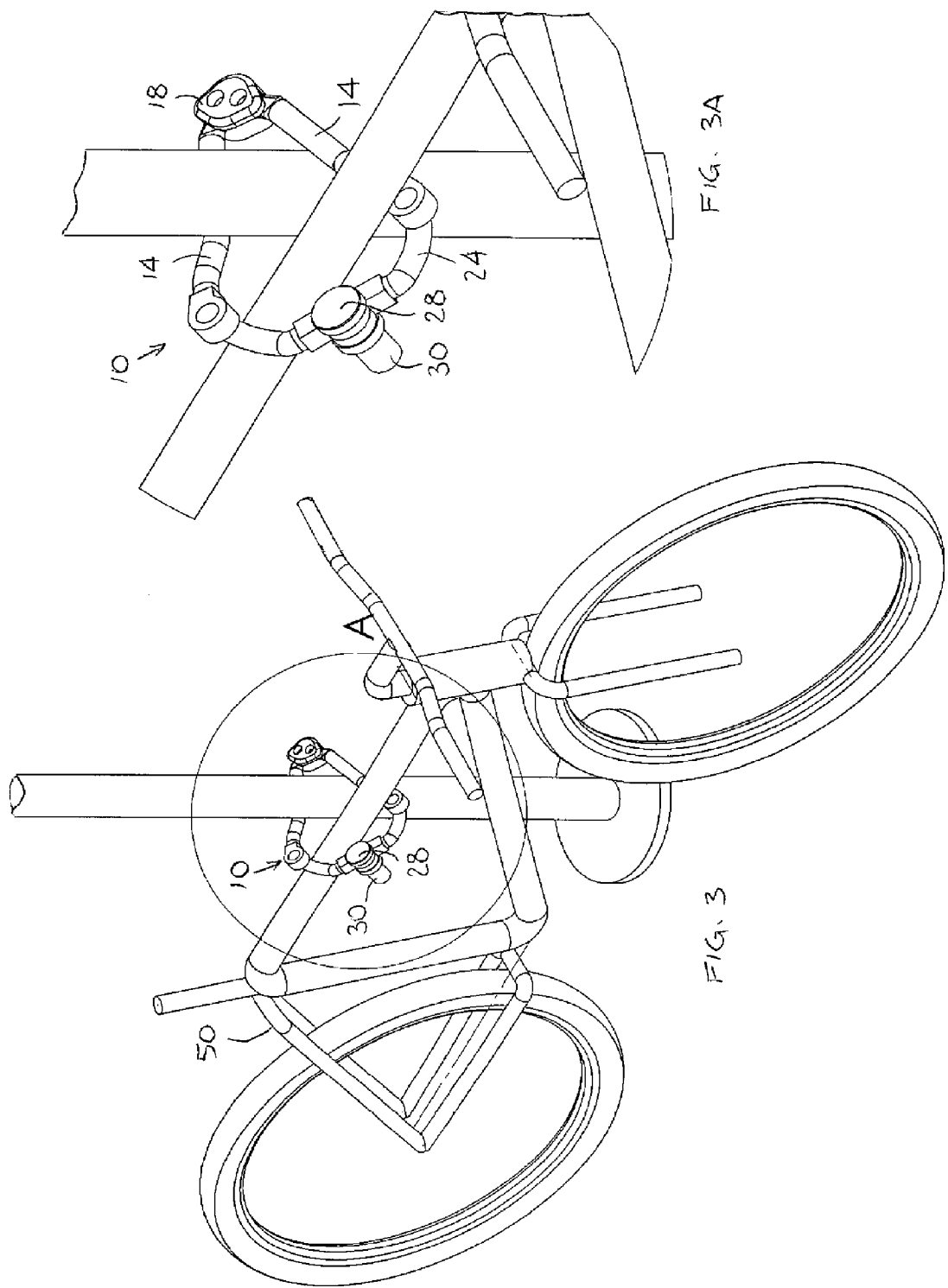

BICYCLE SEAT LOCK

FIELD OF THE INVENTION

This invention relates generally to bicycle seats, and particularly to a bicycle seat that doubles as a bicycle lock.

BACKGROUND OF THE INVENTION

Many kinds of bicycle seats are known (also called bicycle saddles, the terms being used interchangeably). Some are designed to maximize comfort and others are designed for specific purposes such as weight distribution.

SUMMARY OF THE INVENTION

The present invention seeks to provide a novel a bicycle seat, which doubles as a bicycle lock, as is described more in detail hereinbelow.

There is thus provided in accordance with an embodiment of the invention bicycle apparatus for use with a bicycle that includes a bicycle seat post, the apparatus including at least one bicycle seat support member, a pair of locking members mechanically linked to the bicycle seat support member, and a lock adapted to lock the locking members to each other, wherein in a first position the bicycle seat support member is securable to a bicycle seat post of a bicycle for use as a bicycle seat support, and in a second position the bicycle seat support member is arranged for locking the bicycle by being locked with the locking members and the lock.

In accordance with non-limiting embodiments of the invention, the bicycle seat support member is pivotally attached to a pivot block and arranged for pivoting about pivot axes of the pivot block. For example, the bicycle seat support member can be attached to the pivot block with a ratchet connection so that the bicycle seat support member is selectively fixable at different angular positions.

In accordance with non-limiting embodiments of the invention, a pair of saddle members are secured to the bicycle seat support member. At least one rear bracket arm is secured to the bicycle seat support member, the bracket arm being formed with a ring, wherein in the first position the locking members are received in the ring. One of the locking members may be received in an aperture formed in a seat-post adapter block, and the seat-post adapter block can be attached to the bicycle seat post of the bicycle. The locking member can either slip into the aperture or can be locked into the aperture.

BRIEF DESCRIPTION OF THE DRAWINGS

The present invention will be understood and appreciated more fully from the following detailed description taken in conjunction with the drawings in which:

FIGS. 3 and 3A are simplified illustrations of using the bicycle seat to lock a bicycle, in accordance with an embodiment of the present invention.

DETAILED DESCRIPTION OF EMBODIMENTS

Figure 1A:
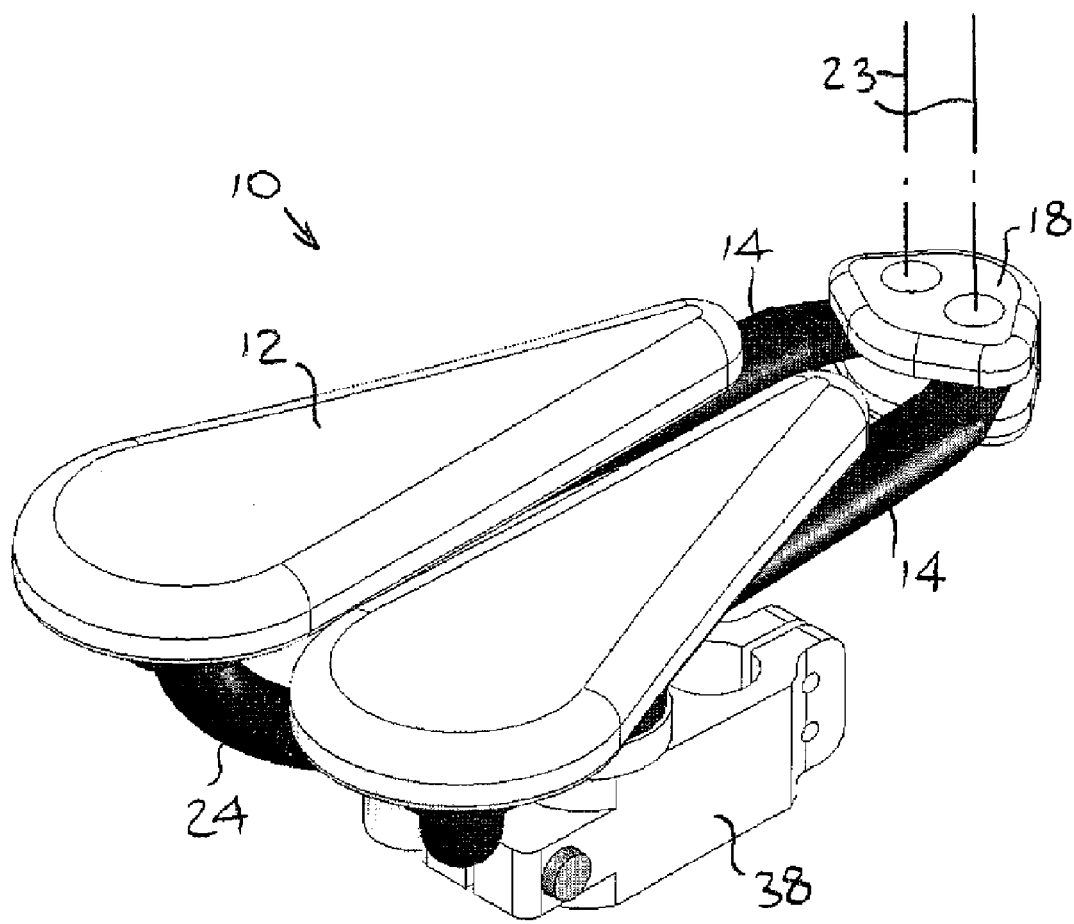
FIGS. 1A, 1B, 1C, and 1D are simplified upper perspective, lower perspective, side-view and exploded illustrations, respectively, of a combination bicycle seat and bicycle lock, constructed and operative in accordance with an embodiment of the present invention.
Figure 1B:
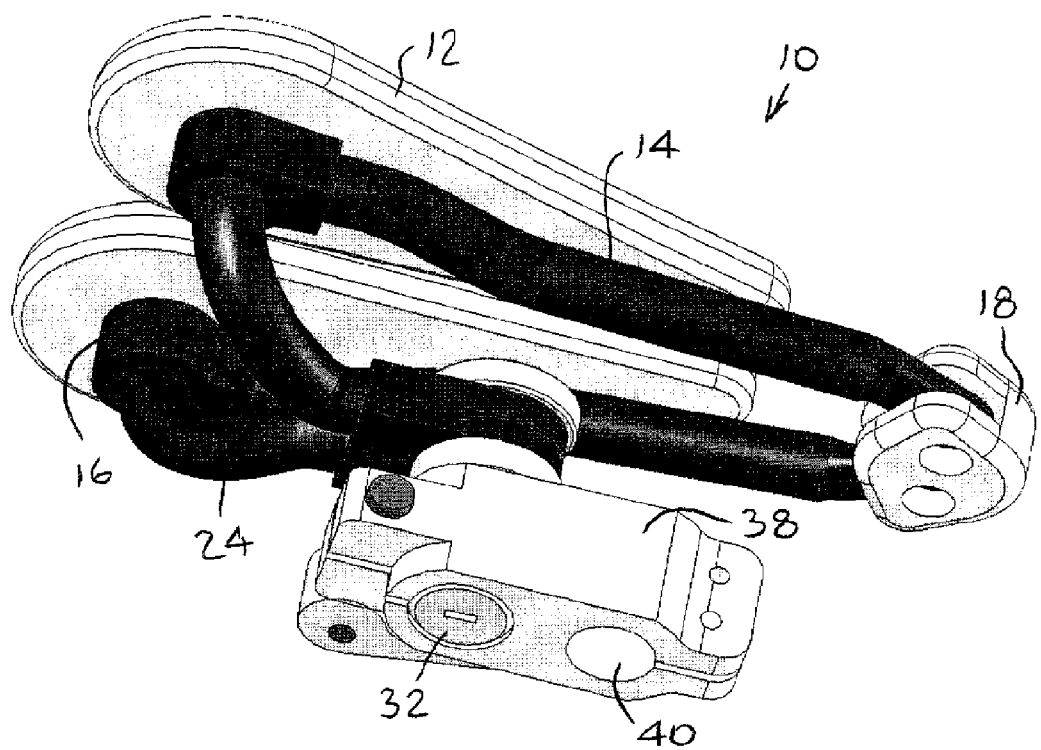
Figure 1C:
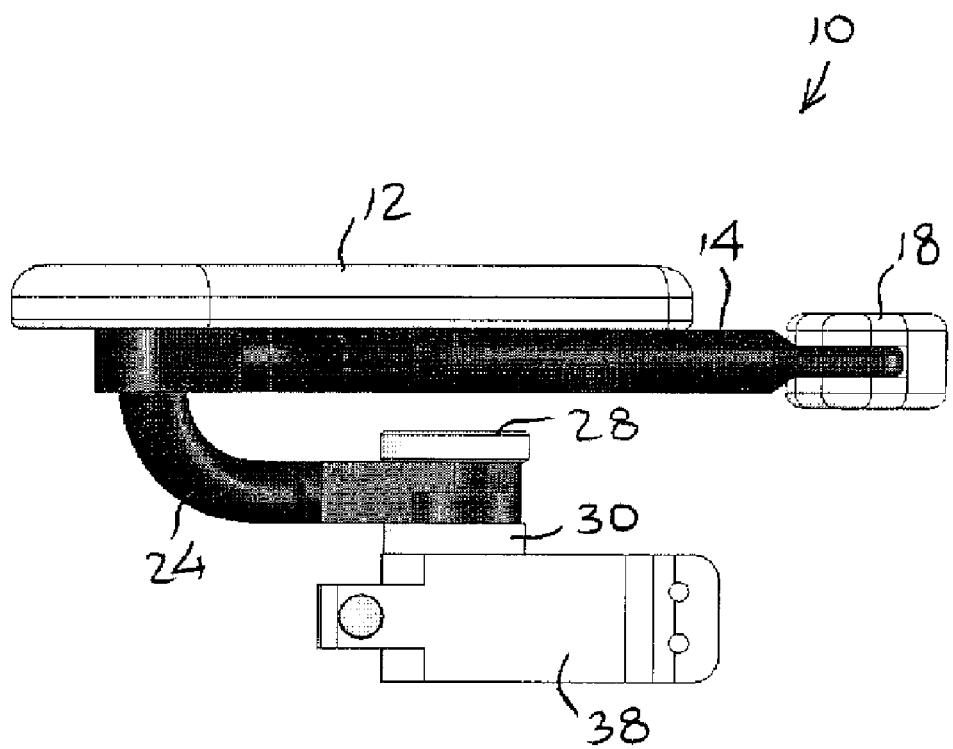
Figure 1D:
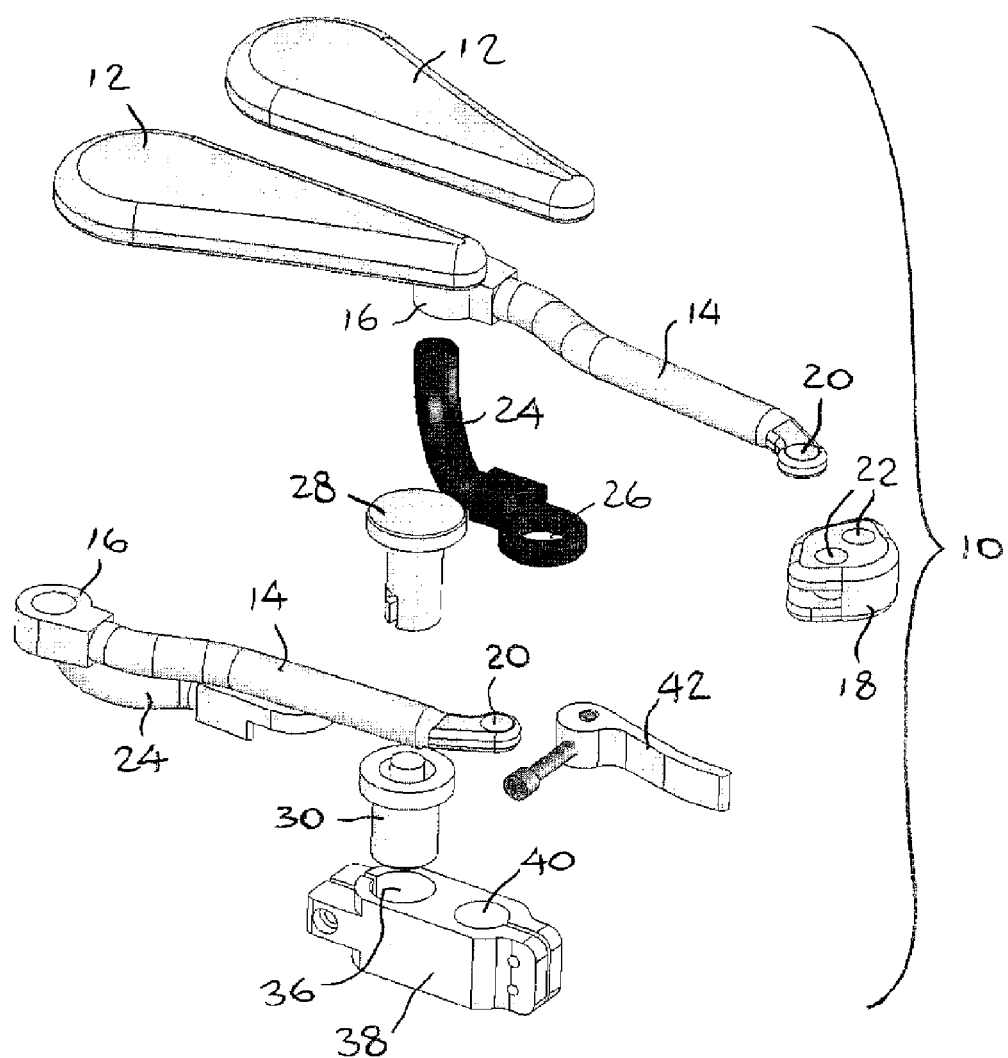

Reference is now made to FIGS. 1A-1D, which illustrate a bicycle seat 10, constructed and operative in accordance with a non-limiting embodiment of the present invention.

In the illustrated embodiment, bicycle seat 10 includes one or more (preferably a pair of) saddle members 12 secured to bicycle seat support members 14, such as at attachment members 16. Saddle members 12 may be detachable from bicycle seat support members 14 (such as with quick release fasteners) or they may be permanently fixed thereto (such as with rivets or bolts and such). Bicycle seat support members 14 are pivotally attached to a pivot block 18. Pivot block 18 is positioned forward of saddle members 12 (that is, forward in the sense of the forward riding direction of the bicycle). For example, each bicycle seat support member 14 is formed with a forward aperture 20 which is pinned to a corresponding aperture 22 formed in pivot block 18. Instead of a simple pinned connection, bicycle seat support members 14 may be attached to pivot block 18 with a ratchet connection (detents and pawls, for example) so that each bicycle seat support member 14 can be rotated about a pivot axis 23 (FIG. 1A) and selectively fixed at different angular (azimuthal) positions. In this manner, the separation between the two saddle members 12 can be adjusted to suit the rider (especially useful for male riders).

A pair of rear bracket arms 24 are secured to the attachment members 16 of bicycle seat support members 14 (either fixedly or removably attached). The bracket arms 24 may or may not be pivotally attached to attachment members 16. The rear portion of each bracket arm 24 may be higher than the forward portion (this being the usual position of the seat with respect to the bicycle frame). The forward portion of each bracket arm 24 is formed with a ring 26.

Figure 2A:
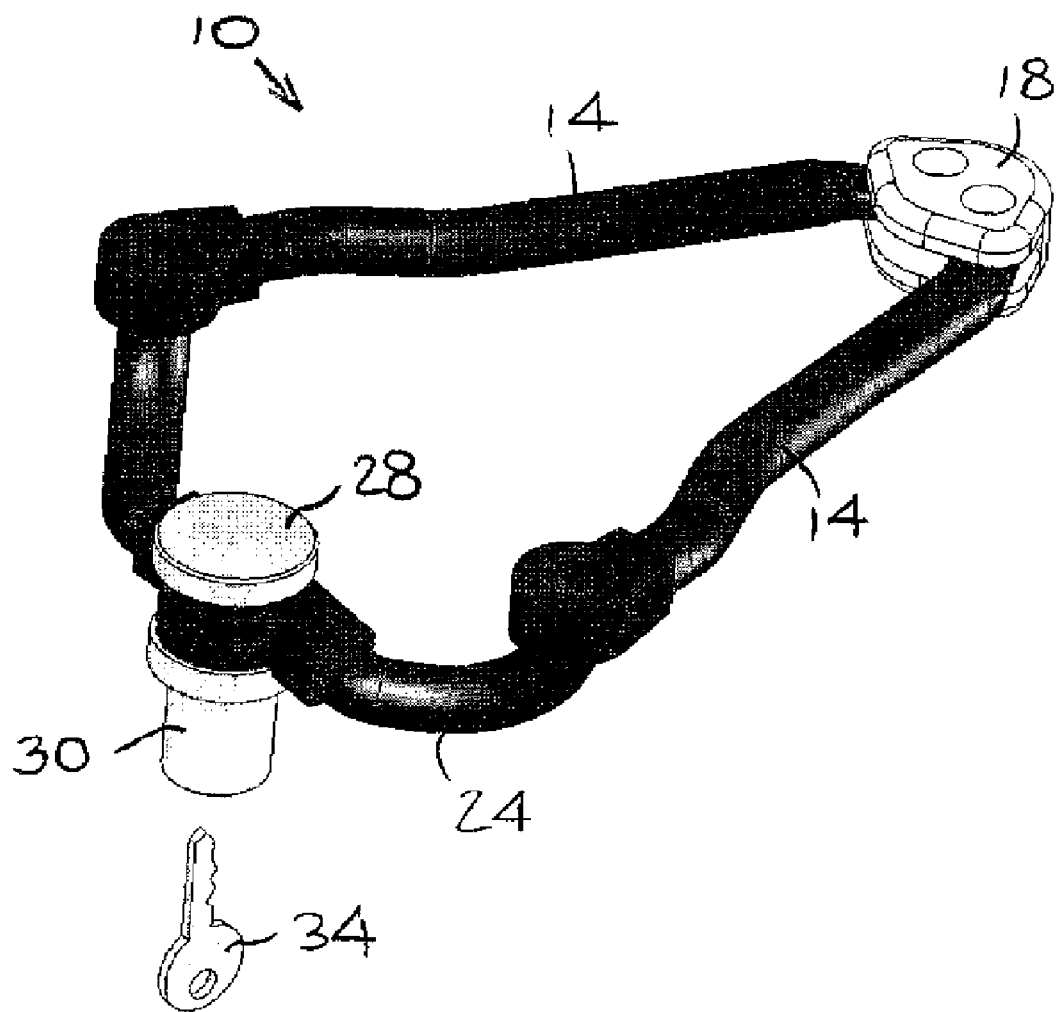
FIGS. 2A and 2B are simplified perspective illustrations of the bicycle lock of FIGS. 1A-1D, respectively in locked and unlocked orientations.
Figure 2B:
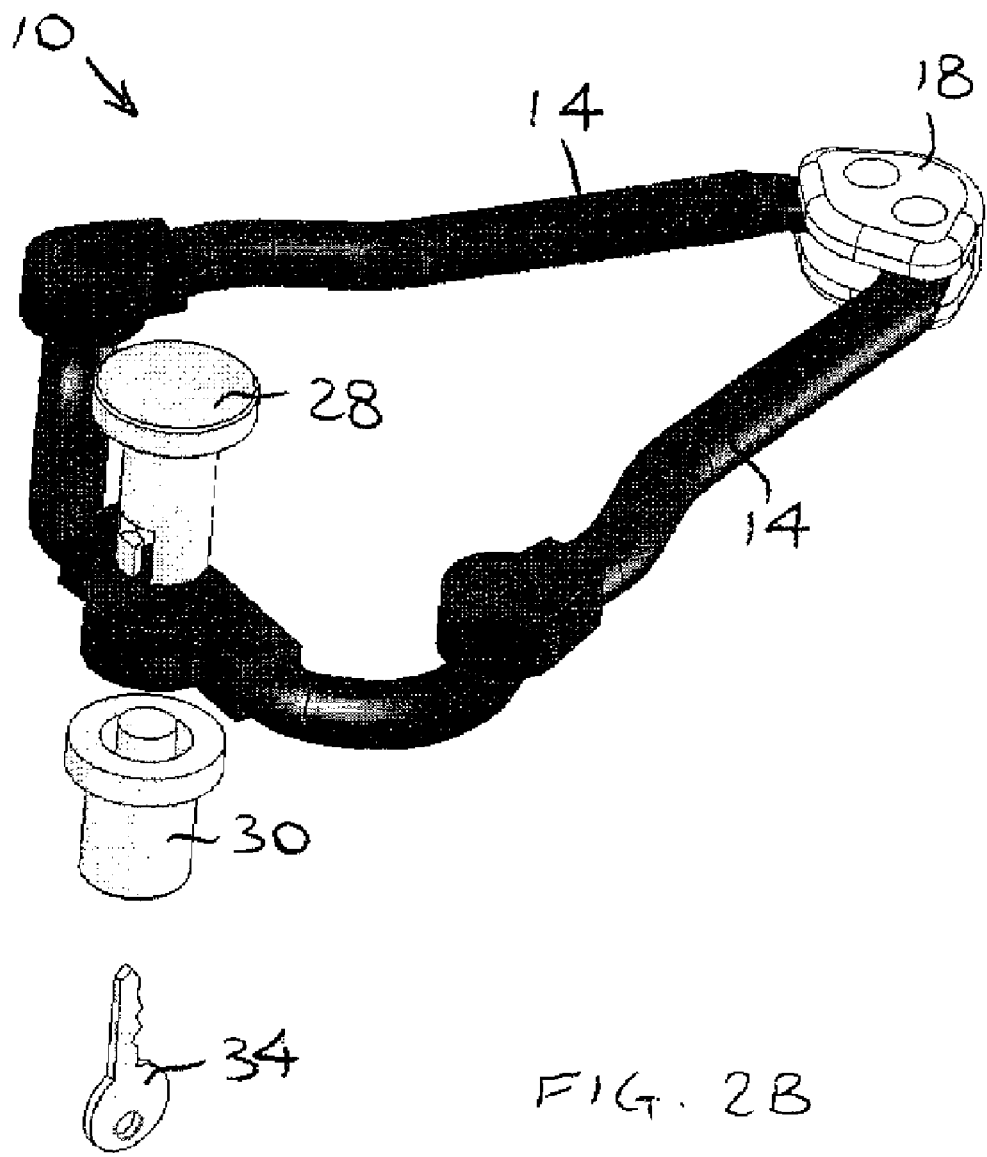

Reference is made additionally to FIGS. 2A and 2B. Upper and lower locking members 28 and 30 are received in rings 26. The lower locking member 30 includes a lock 32 (FIG. 1B), such as a cylinder tumbler lock, which is opened with a suitable key 34. The lower locking member 30 is received in an aperture 36 formed in a seat-post adapter block 38. The seat-post adapter block 38 can be slipped over a seat post of a bicycle (not shown) by means of another aperture 40 and tightened by means of a (standard) tightener 42. The lower locking member 30 may be simply slipped into aperture 36. Alternatively, lock 32 may be used to lock lower locking member 30 into aperture 36 (such as by means of a locking tongue that is operated by turning the key 34 and which engages a groove or similar member in seat-post adapter block 38).

It is clear from the foregoing description that bicycle seat 10 can be easily attached to the bicycle seat post by means of seat-post adapter block 38.

Reference is now made to FIGS. 3 and 3A. In accordance with an embodiment of the present invention, bicycle seat 10 can be removed from seat-post adapter block 38 (either by simply lifting out of aperture 36 or by first unlocking lock 32 and then lifting out of aperture 36) and used as a bicycle lock to lock a bicycle 50. Upper and lower locking members 28 and 30 are separated and the two bicycle seat support members 14 are spread apart by pivoting about pivot block 18 (that is, pivoting about pivot axes 23 shown in FIG. 1A). The bicycle seat support members 14 are placed about some suitable structure for locking the bicycle 50 and locking members 28 and 30 are locked together with lock 32.

It is noted that the seat post of the bicycle can also form part of the lock of the invention. For example, the seat post can be used like the post of a steering wheel lock to lock the bicycle to some object with locking members 28 and 30.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately or in any suitable subcombination.

What is claimed is:

1. Bicycle apparatus for use with a bicycle that includes a bicycle seat post, the apparatus comprising:
    at least two bicycle seat support members;
    at least two saddle members secured to said bicycle seat support members;
    a pair of locking members mechanically linked to said bicycle seat support members; and
    a lock adapted to lock said locking members to each other, wherein in a first position said bicycle seat support members are securable to a bicycle seat post of a bicycle for use as a bicycle seat support, and in a second position said bicycle seat support members are arranged for locking the bicycle by being locked with said locking members and said lock, wherein one of said locking members is received in an aperture formed in a seat-post adapter block, said seat-post adapter block being attachable to the bicycle seat post of the bicycle, and wherein in the second position said saddle members are moved to a different position with respect to each other than in the first position.

2. The bicycle apparatus according to claim 1, wherein said bicycle seat support members are pivotally attached to a pivot block and arranged for pivoting about pivot axes of said pivot block.

3. The bicycle apparatus according to claim 2, wherein said bicycle seat support members are attached to said pivot block with a ratchet connection so that said bicycle seat support members are selectively fixable at different angular positions.

4. The bicycle apparatus according to claim 2, wherein said saddle members pivot together with said bicycle seat support members.

5. The bicycle apparatus according to claim 1, further comprising at least one rear bracket arm secured to said bicycle seat support members, said bracket arm being formed with a ring, wherein in the first position said locking members are received in said ring.

6. The bicycle apparatus according to claim 1, wherein said locking member slips into said aperture.

7. The bicycle apparatus according to claim 1, wherein said locking member is lockable into said aperture.

* * * * *